United States Patent [19]

Itsu

[11] Patent Number: 5,128,571
[45] Date of Patent: Jul. 7, 1992

[54] HARD DISK DRIVING MOTOR

[75] Inventor: Takamasa Itsu, Kanagawa, Japan

[73] Assignee: Nippon Seiko K.K., Tokyo, Japan

[21] Appl. No.: 605,330

[22] Filed: Oct. 30, 1990

[30] Foreign Application Priority Data

Oct. 31, 1989 [JP] Japan .................................. 1-281976

[51] Int. Cl.⁵ ............................................ H02K 11/00
[52] U.S. Cl. .................................... 310/67 R; 310/90; 310/261; 310/156; 384/615
[58] Field of Search ................... 310/66, 67 R, 89, 90, 310/91, 152, 156, 261; 384/615, 621, 494

[56] References Cited

U.S. PATENT DOCUMENTS

| | | | |
|---|---|---|---|
| 4,389,586 | 6/1983 | Foster et al. | 310/67 R |
| 4,585,963 | 4/1986 | Wilkinson, Jr. et al. | 310/67 R |
| 4,647,803 | 3/1987 | von der Heide et al. | 310/67 R |
| 4,672,250 | 6/1987 | Seitz | 310/67 R |
| 4,980,587 | 12/1990 | Yonei et al. | 310/67 R |

Primary Examiner—Steven L. Stephan
Assistant Examiner—Matthew Nguyen
Attorney, Agent, or Firm—Sughrue, Mion, Zinn, Macpeak & Seas

[57] ABSTRACT

In a hard disk driving motor comprising: an armature winding rotatably supported around the rotary shaft through a rolling bearing; and rotor magnets fixedly mounted on the inner wall of a hub secured to one end of the shaft in such a manner that they confront with the outer cylindrical wall of the armature winding, the bearing is a rolling bearing with plural race tracks which comprises an outer race in the inner wall of which a plurality of outer tracks are formed, and the armature winding is fixedly mounted directly on the outer wall of the outer race, to reduce the outside diameter of the motor.

10 Claims, 3 Drawing Sheets

HARD DISK DRIVING MOTOR

BACKGROUND OF THE INVENTION

This invention relates to an electric motor for driving a hard disk which is used, for instance, as an external memory unit of a computer.

Heretofore, a device for rotating a hard disk (hereinafter referred to as "a hard disk driver" or "an HDD", when applicable) includes a spindle motor as shown in FIG. 7.

The spindle motor is designed as follows: Its rotary shaft 3 is rotatably supported through rolling bearings 4 an 4 on the inner wall of a cylindrical support 2, which has a flange 1 extended radially outwardly of its periphery. The flange 1 is fixedly mounted on a mounting base board or the like. A hub 5 serving as a rotor is fixedly mounted on one end portion of the rotary shaft 3. A hard disk is fixedly secured to the hub 5.

Each of the bearings 4 and 4 has an inner race 8 which has an inner track 6 in its outer cylindrical wall and is fixedly mounted on the rotary shaft 3, and an outer race 10 which has an outer track 9 in its inner cylindrical wall and is fitted in the inner wall of the support 2, and a plurality of rolling elements 7.

An armature winding 11 is fixedly mounted on the outer wall of the support 2. Rotor magnets 13 are fixedly mounted on the inner wall of the cylindrical part 12 of the hub 5 in such a manner as to confront the outer cylindrical wall of the armature winding 11. Thus, by applying current to the armature winding 11, the hub 5 is rotated around the central axis of the rotary shaft 3.

However, the hard disk driving motor thus constructed suffers from the following difficulty:

As was described above, in order to rotatably support the rotary shaft 3 inside the armature winding 11, the bearings 4 and 4 each comprising the inner race 8, the outer race 10, and the rolling elements 7 are fitted in the cylindrical support 2, and the rotary shaft 3 is fitted in the bearings 4 and 4.

Hence, unavoidably the width T of the gaps 14, which are formed between the cylindrical surface of the rotary shaft 3 and the inner wall of the support to receive the bearings 4 and 4, is relatively large, and accordingly the outside diameter R of the spindle motor is relatively large.

On the other hand, there is a tendency for a hard disk driver installation space to be extremely decreased for instance because of the popularization of lap-top type OA (office automation) equipment. Hence, it is not desirable that the outside diameter D of the spindle motor is increased even slightly because of the above-described reason.

SUMMARY OF THE INVENTION

Accordingly, it is an object of this invention to eliminate the above-described difficulty accompanying a conventional hard disk drive motor.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the hard disk driving motor comprises: a rotary shaft; an armature winding supported around the shaft through rolling bearing means in such a manner as to freely make relative rotation to the shaft; and rotor magnets fixedly mounted on the inner wall of a member secured to one end of the shaft in such a manner that the rotor magnets confront the outer cylindrical wall of the armature winding, in which, according to the invention, the bearing is a rolling bearing with plural raceways which comprises an outer race in the inner wall of which a plurality of outer tracks are formed, and the armature winding is fixedly mounted directly on the outer wall of the outer race.

With the hard disk driving motor of the invention, the hard disk is rotated similarly as in the case of the above-described conventional hard disk driving motor. However, it should be noted that, in the hard disk driving motor of the invention, the armature winding is mounted directly on the outer wall of the outer race of the rolling bearing provided around the rotary shaft, and therefore the distance between the shaft and the inner wall of the armature winding can be reduced as much, with the result that the outside diameter of the motor can be decreased accordingly.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

DETAILED DESCRIPTION OF THE INVENTION

Preferred embodiments of this invention will be described with reference to the accompanying drawings in detail.

Figure 1:
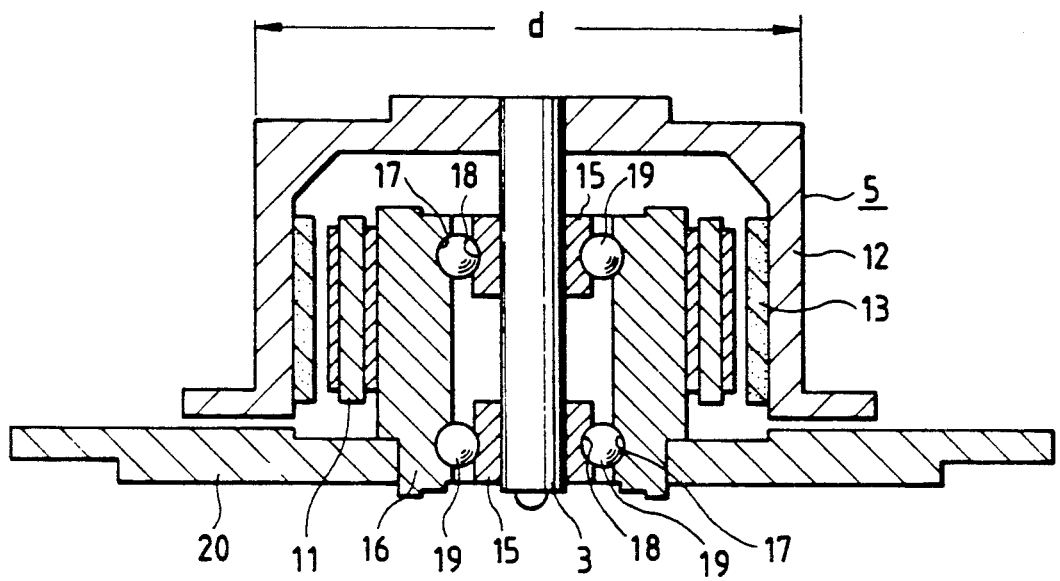
FIG. 1 is a sectional view showing a first example of a hard disk driving motor according to this invention.

A first example of a hard disk driving motor according to the invention will be described with reference to FIG. 1.

A hub 5 serving as a rotor is secured to one end portion of a rotary shaft 3, on which a pair of inner races 15 and 15 are mounted to form a rolling bearing with plural raceways together with an outer race 16. The outer race 16 is in the form of a cylinder, and has two outer tracks 17 and 17 formed in its inner wall near the two ends.

Rolling elements 19 are provided between the outer tracks 17 and 17 and the inner tracks 18 and 18 formed in the outer walls of the inner races 15 and 15, so that the rotary shaft 3 is freely rotatable inside the outer race 16. In supporting the rotary shaft 3 with the rolling bearing, one of the inner races 15 is fixedly mounted on the rotary shaft 3, and then the other inner race 15 is pushed axially (vertically in FIG. 1) so that it is fixedly mounted on the rotary shaft 3 with the rolling elements 19 pressurized suitably.

An annular mounting flange 20 is fixedly mounted on one end portion (the lower end portion in FIG. 1) of the outer race 16.

An armature winding 11 is mounted directly on the outer wall of the outer race 16.

Rotor magnets 13 are fixedly supported on the inner wall of a cylindrical part 12 of the hub 5 in such a manner as to confront the outer wall of the armature winding 11. Thus, by applying current to the armature winding 11, the hub 5 is rotated around the central axis of the rotary shaft.

Similarly as in the case of the above-described conventional hard disk driving motor, the hard disk is rotated through the hub 5. That is, in order to rotate the hard disk secured to the hub 5, the latter 5 is rotated as follows: The armature winding 11 mounted on the outer race 16 is energized to form a repulsive force between the armature winding 11 and the rotor magnets 13 fixedly mounted on the inner wall of the cylindrical part 12, thereby to rotate the hub 5.

As was described above, in the hard disk driving motor, the armature winding 11 is directly mounted on the outer race 16 which forms the rolling bearing on the rotary shaft, and therefore the distance between the cylindrical surface of the rotary shaft 3 and the inner cylindrical wall of the armature winding 11 is reduced when compared with that in the conventional hard disk driving motor, and the outside diameter (d) of the motor is decreased as much.

Figure 2:
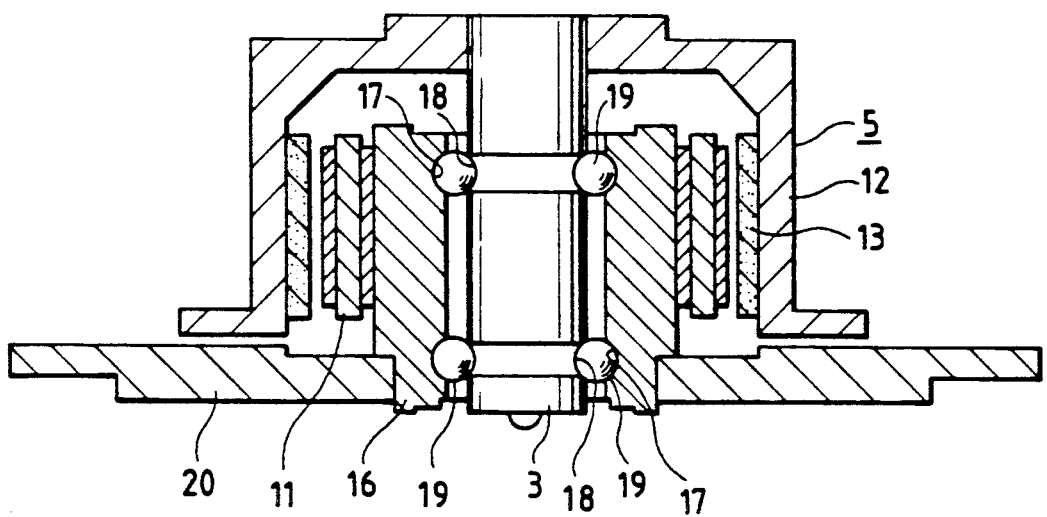
FIG. 2 is a sectional view showing a second example of the hard disk driving motor according to the invention.

A second example of the hard disk driving motor according to the invention will be described with reference to FIG. 2.

In the second example, a pair of inner tracks 18 and 18 are formed in the rotary shaft 3, thus eliminating the inner races 15 in the first example.

Hence, in the second example, the distance between the cylindrical surface of the rotary shaft 3 and the inner cylindrical wall of the armature 11 can be reduced as much as the inner races 15 and 15 are eliminated, and accordingly the outside diameter of the hard disk driving motor can be decreased more.

In the example, the rolling elements 19 are set between the rotary shaft 3 and the outer race 16 while being pressurized suitably.

A third example of the hard disk driving motor according to the invention will be described with reference to FIG. 3.

The third example has an annular seal board 21 secured to the surface of the middle portion of the shaft 3, and an annular seal board 22 secured to the inner wall of the open end portion of the outer race 16. A cylindrical space 23 is formed between the inner wall of the outer race 16 and the surface of the rotary shaft 3 which the inner races are formed to receive rolling elements 19. The above-described annular seal boards 21 and 22 act to close, of the two end openings of the cylindrical space 23, at least the opening (the upper opening in FIG. 3) which confronts with the clean space accommodating the hard disk fixedly mounted on the hub 5.

In other words, the cylindrical outer wall of the annular seal board 21 secured to the surface of the middle portion of the rotary shaft 3 is set close to the inner wall of the outer race 16, while the cylindrical inner wall of the annular seal board 22 secured to the inner wall of the open end portion of the outer race 16 is set close to the surface of the middle portion of the rotary shaft 3, to form a kind of labyrinth seal at the opening mentioned above, thereby to prevent the grease surrounding the rolling elements 19 from entering the clean space.

Figure 3:
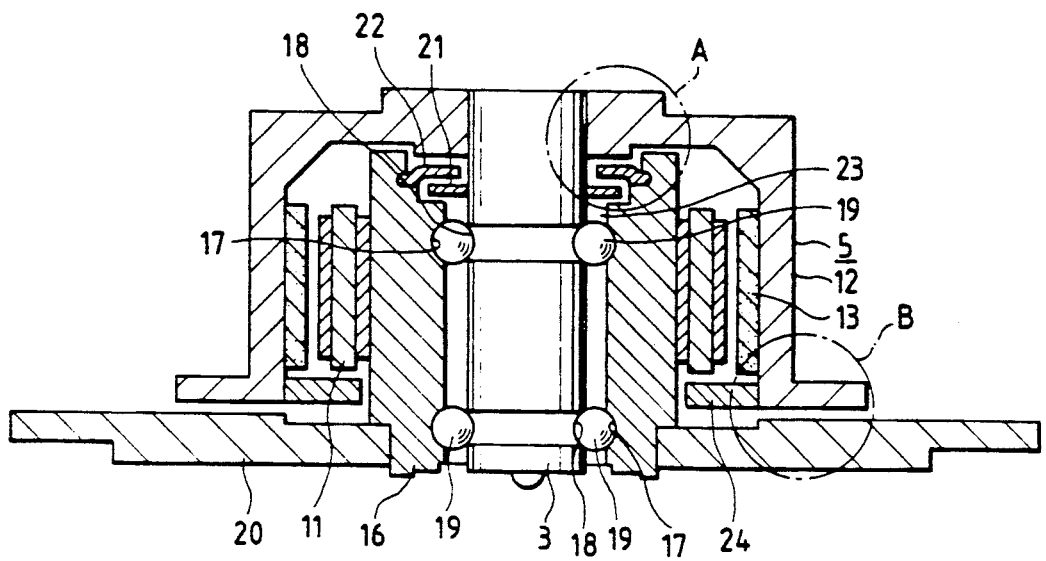
FIG. 3 is a sectional view showing a third example of the hard disk driving motor according to the invention.

Furthermore, in the third example, as shown in FIG. 3, an annular seal board 24 is secured to the inner wall of the open end portion of the cylindrical part 12 in such a manner that the inner cylindrical wall of the seal board 14 is set close to the outer wall of the outer race 16, to form a labyrinth seal between the seal board 14 and the outer race 16.

In order to prevent the grease surrounding the rolling elements 19 from leaking into the clean space, the labyrinth seal may be formed between the end face of the outer race 16 and the inner wall of the hub 5, or between the mounting flange 20 and the hub 5.

Figure 4:
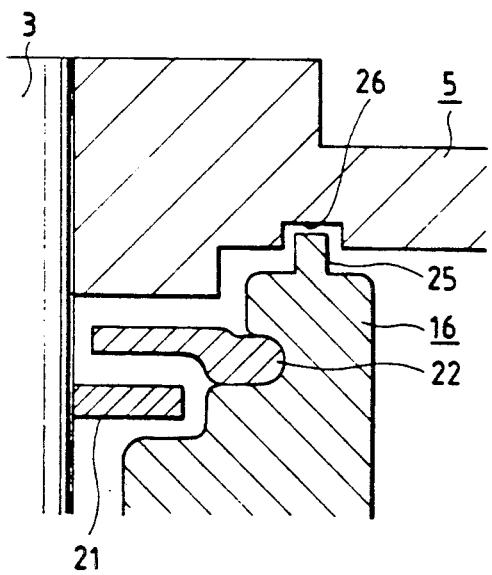
FIG. 4 is an enlarged sectional view of a part of a fourth example of the hard disk driving motor according to the invention, which part corresponds to the circle A in FIG. 3.

In the former case, as shown in FIG. 4 an annular protrusion 25 is formed on the end face of the outer race 16, while an annular groove 26 is formed in the inner wall of the hub 5 in such a manner as to be in alignment with the annular protrusion 25. In this case, a bent flow path serving as a labyrinth seal is formed between the end face of the outer race 16 and the inner wall of the hub 5.

Figure 5:
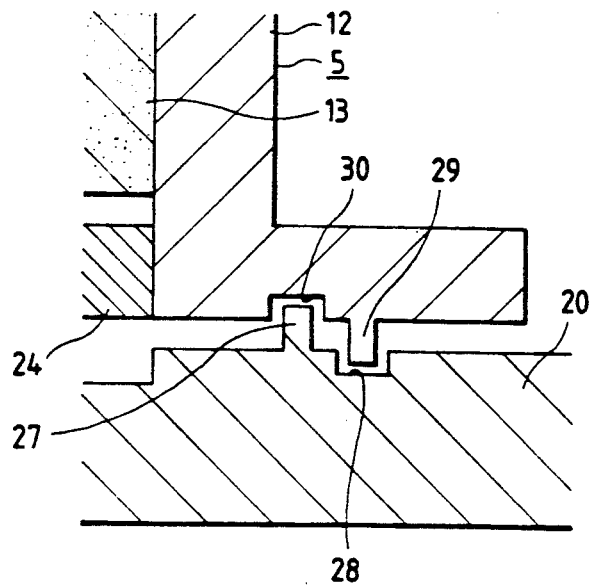
FIG. 5 is an enlarged sectional view of a part of a fifth example of the hard disk driving motor according to the invention, which part corresponds to the circle B in FIG. 3.

In the latter case, as shown in FIG. 5 the mounting flange 20 has an annular protrusion 27 and an annular groove 28 in the upper surface while the hub 5 has an annular protrusion 29 and annular groove 30 in such a manner as to be in alignment with the annular groove 28 and the annular protrusion 27, respectively. In this case also, a bent flow path serving as a labyrinth seal is formed between the mounting flange 20 and the end face of the hub 5.

Figure 6:
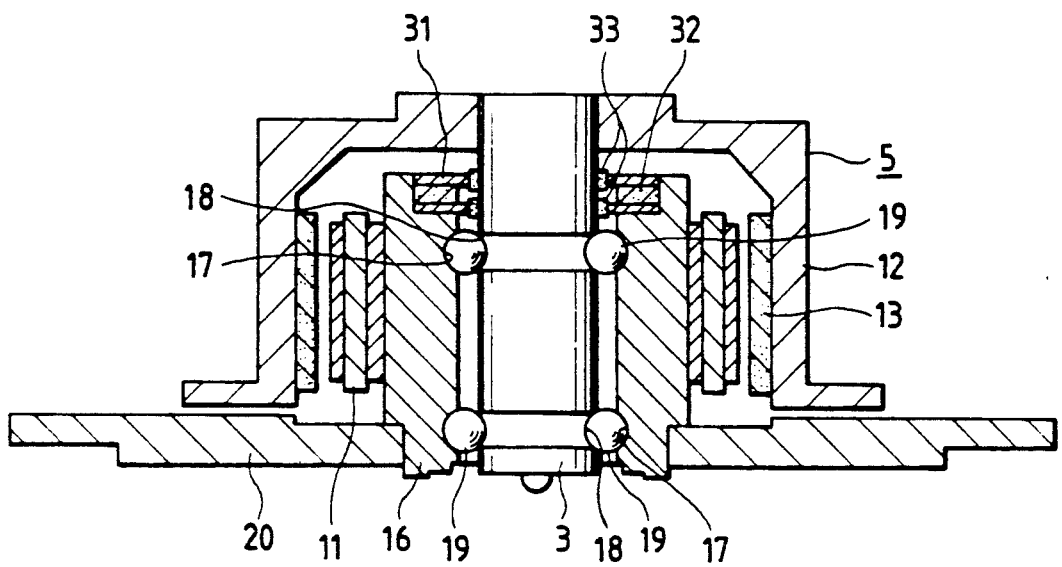
FIG. 6 is a sectional view showing a sixth example of the hard disk driving motor according to the invention.
Figure 7:
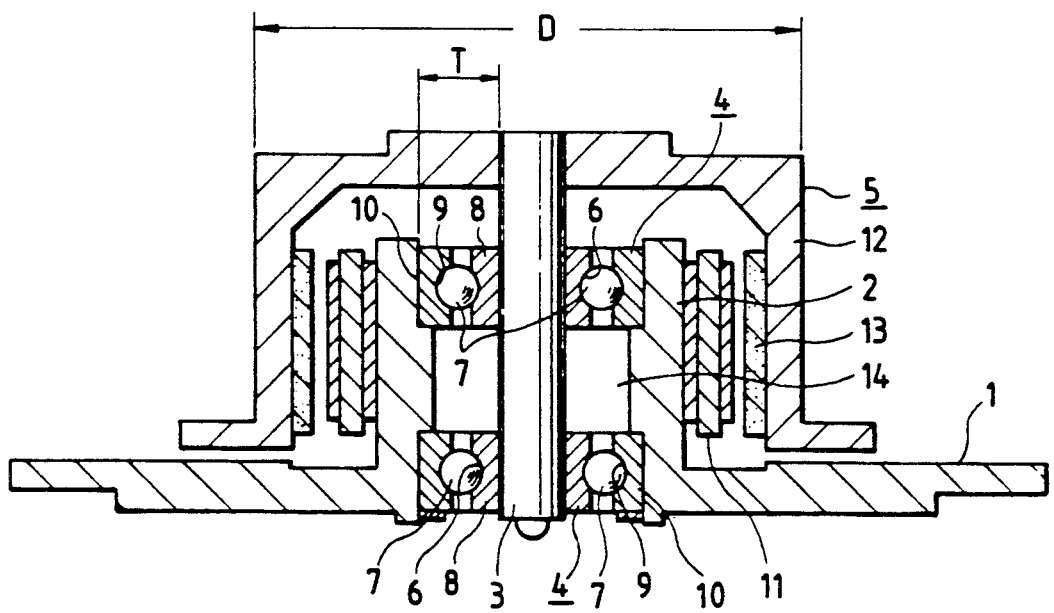
FIG. 7 is a sectional view showing a conventional hard disk driving motor.

Furthermore, instead of or in addition to the provision of the above-described labyrinth seals, a magnetic fluid seal may be provided in order to prevent the entrance of the grease surrounding the rolling elements 19 into the clean space. The magnetic fluid seal, as shown in FIG. 6, comprises: annular pole pieces 31 and 31; an annular permanent magnet 32 held between the pole pieces 31 and 31, the magnet being magnetized in the axial direction; and magnetic fluids 33 and 33 held between the rotary shaft and the inner cylindrical walls of the pole pieces 31 and 31 by the magnetic force of the permanent magnet 32. The magnetic fluid seal is provided between the inner cylindrical wall of the end portion of the outer race 16 and the surface of the middle portion of the rotary shaft 3.

As is apparent from the above description, the hard disk driving motor according to the invention is smaller in outside diameter than the conventional one. Hence, with the motor of the invention, a variety of devices incorporating a motor driven hard disk can be miniaturized.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A hard disk driving motor comprising:
   a fixed outer race having plural race tracks on an inner cylindrical wall thereof;
   an inner rotary member having plural race tracks on an outer cylindrical wall thereof;
   rolling elements rotatably provided between said outer race and said rotary member so as to rotatably support said rotary member with respect to said fixed outer race;
   a rotor hub fixedly mounted on the rotary member and having a cylindrical portion;
   a rotor magnet fixedly mounted on the inner wall of the cylindrical portion of said hub; and
   an armature winding directly mounted on the outer wall of said fixed outer race so as to confront with said rotor magnet.

2. A hard disk driving motor as claimed in claim 1, wherein said rotary member comprises a rotary shaft and plural inner races, each having an inner race track, and said rotary member and said outer race are assembled with said rolling elements, provided between said inner race track and said outer race track, being pressurized.

3. A hard disk driving motor as claimed in claim 1 further comprising:
   means for sealing at least one opening which confronts a clean space accommodating a hard disk.

4. A hard disk driving motor as claimed in claim 3, wherein said sealing means is provided to seal at least one of both end openings of a cylindrical space which is formed between the inner wall of said outer race and the outer wall of said rotary member and which contains said rolling element.

5. A hard disk driving motor as claimed in claim 4, wherein said sealing means comprises at least one annular seal board fixedly secured to said inner wall of an end portion of said outer race.

6. A hard disk driving motor as claimed in claim 3 wherein said sealing means comprises a magnetic fluid seal provided to prevent the entrance of a grease surrounding said rolling elements into said clean space, said magnetic fluid seal comprising annular pole pieces, an annular permanent magnet held between said pole pieces, said magnet being magnetized in the axial direction, and magnetic fluids held between said rotary member and said inner cylindrical walls of said pole pieces by the magnetic force of said permanent magnet.

7. A hard disk driving motor as claimed in claim 2 further comprising:
   means for sealing at least one opening which confronts a clean space accommodating a hard disk.

8. A hard disk driving motor as claimed in claim 7, wherein said sealing means is provided to seal at least one of both end openings of a cylindrical space which is formed between the inner wall of said outer race and the outer wall of said inner race and which contains said rolling element.

9. A hard disk driving .motor as claimed in claim 8, wherein said sealing means comprises at lease one annular seal board fixedly secured to said inner wall of an end portion of said outer race.

10. A hard disk driving motor as claimed in claim 7 wherein said sealing means comprises a magnetic fluid seal provided to prevent the entrance of the grease surrounding said rolling elements into said clean space, said magnetic fluid seal comprising annular pole pieces, an annular permanent magnet held between said pole pieces, said magnet being magnetized in the axial direction, and magnetic fluids held between said rotary shaft and said inner cylindrical walls of said pole pieces by the magnetic force of said permanent magnet.

* * * * *